(12) United States Patent
Farquhar

(10) Patent No.: US 6,293,736 B1
(45) Date of Patent: Sep. 25, 2001

(54) PLENUM AND CROSS BLOCK FOR A PNEUMATIC CONVEYOR

(76) Inventor: David A. Farquhar, 313 Petheram Place, Newmarket, Ontario (CA), L3X 1J8

( * ) Notice: Subject to any disclaimer, the term of this patent is extended or adjusted under 35 U.S.C. 154(b) by 0 days.

(21) Appl. No.: 09/465,452

(22) Filed: Dec. 17, 1999

(51) Int. Cl.[7] .................................................. B65G 47/24
(52) U.S. Cl. ................................ 406/87; 406/88; 406/194
(58) Field of Search ............................. 406/87, 88, 191, 406/194

(56) References Cited

U.S. PATENT DOCUMENTS

| | | | |
|---|---|---|---|
| 5,695,302 | * | 12/1997 | Hibish ..................................... 406/88 |
| 5,820,306 | * | 10/1998 | Hilbish et al. ......................... 406/88 |
| 5,947,647 | * | 9/1999 | Quellette .............................. 406/191 |
| 6,024,518 | * | 2/2000 | Quellette .............................. 406/88 |
| 6,033,156 | * | 3/2000 | Marti Sala .............................. 406/86 |
| 6,190,094 | * | 2/2001 | Rediess et al. ......................... 406/19 |

* cited by examiner

Primary Examiner—Christopher P. Ellis
Assistant Examiner—Joe Dillon, Jr.
(74) Attorney, Agent, or Firm—Merek & Voorhees

(57) ABSTRACT

A plenum for a pneumatic conveyor of the type used for the movement of bottles and the like. The plenum comprises a central housing for receiving pressurized air, a cross block positioned within the central housing and generally spanning across its width, at least two bottle neck supports permitting bottles to be suspended from the plenum, and an air diverter to divert pressurized air from the interior of the central housing to the bottle neck supports to drive bottles along the length of the plenum. The cross block fixes the vertical positioning of the bottle neck supports to maintain the bottle neck supports in a parallel and co-planer configuration thereby helping to maintain the vertical alignment of bottles and the like suspended from the plenum and facilitating in their movement along the length of the plenum. The invention also comprises a cross block for use in a pneumatic conveying system to assist in maintaining the vertical alignment of bottles or the like suspended from and transported along the conveying system.

11 Claims, 6 Drawing Sheets

PLENUM AND CROSS BLOCK FOR A PNEUMATIC CONVEYOR

FIELD OF THE INVENTION

This invention relates generally to air conveyors, and in particular a new and novel plenum and cross block for air conveyors of the type used for the movement of bottles, containers, and similar objects.

BACKGROUND OF THE INVENTION

In bottling and manufacturing operations, whether it be the bottling of food products, drinks, household or industrial cleaners, or other liquids and fluids, the operation of an efficient production facility often requires the ability to transport large numbers of bottles quickly, efficiently and inexpensively. Today, a very significant number of liquid products that are commercially produced are bottled and sold in plastic bottles, and most commonly polyethylene bottles.

A variety of different mechanisms and devices have been developed in order to permit bottlers, bottle manufacturers, and bottling facilities to transport bottles or containers to different stages throughout a bottling or manufacturing plant. One such device that has proven to provide an efficient and economical way to rapidly transport large numbers of plastic bottles is a pneumatic or air conveyor system. Such systems typically comprise a generally enclosed chamber or plenum having a pair of bottle neck supports mounted on its bottom surface from which a series of plastic bottles can be suspended. Adjacent to the bottle neck supports there is positioned a louver system that directs or diverts pressurized air from the interior of the plenum toward the bottles to effectively drive the bottles alone the length of the plenum and the conveyor system.

One of the primary difficulties encountered when utilizing pneumatic conveyor systems of the type described above is a vertical mis-alignment of plastic bottles as they are driven or transported along the length of the conveyor. A common reason for mis-alignment of the bottles is an improper positioning of the bottle neck supports. Typically the bottle neck supports are bolted to the bottom surface of the plenum, which in many cases in not perfectly perpendicular to the sides of the plenum, thereby causing the bottles to be tilted to one side or the other when traveling along the conveyor. Since pneumatic conveyors are often comprised of a large number of plenum sections the mis-alignment of the bottle neck supports may be different for subsequent or adjacent plenum sections. As a result, a bottle traveling along the length of a conveyor may be sporadically driven out of vertical alignment in opposite directions as it passes along the conveyor. The mis-alignment of bottles traveling along the conveyor results in a decrease in the efficiency in the number of bottles moved per unit time, and can also result in the jamminig or backing up of a series of bottles, particularly at corners or places along the conveyor where there is a significant change in the direction of transportation. During high speed transport, a mis-alignment of bottles can have dramatic consequences and cause a back-up or jamming effect, thereby reducing the overall throughput of the system.

To combat this problem others have utilized horizontal rails or bottle guides that extend downwardly from the sides of the plenum and that help to contain or limit the amount of vertical displacement of the bottles as they are transported. While such devices have met With some success, when a bottle is out of vertical alignment and contacts such guide mechanisms or rails there is an increased frictional resistance placed upon the linear movement of the bottle that has a tendency of reducing the conveyor's overall capacity. Excessive contact between the bottles and horizontal guide rails can also result in a marking or scoring of the exterior surface of the bottle. In addition, regardless of the use of horizontal guide rails, severely misaligned bottles may still jam and cause a stoppage of production.

SUMMARY OF THE INVENTION

The invention therefore provides a plenum for a pneumatic conveyor, and a cross block for use in such a plenum, that assists in maintaining the vertical alignment of bottles and the like suspended from the plenum, and that assists in facilitating the movement of bottles and the like along the length of a pneumatic conveyor.

Accordingly, in one of its aspects the invention provides a plenum for a pneumatic conveyor of the type used for the movement of bottles and the like, the plenum comprising a central housing for receiving pressurized air, said central housing having generally enclosed top and side panels, and having a generally open bottom; a cross block positioned within said central housing and generally spanning across its width; at least two bottle neck support means, said bottle neck support means permitting bottles to be suspended from said plenum; air diversion means to divert pressurized air from the interior of said central housing to said bottle neck support means to drive bottles along the length of said plenum; and, means to enclose said open bottom of said central housing; wherein said cross block fixes the vertical positioning of said bottle neck support means to maintain said bottle neck support means in a parallel and co-planer configuration thereby helping to maintain the vertical alignment of bottles and the like suspended from said plenum and facilitating in their movement along the length of said plenum.

In a further aspect the invention provides a cross block for use in a pneumatic conveyor, the pneumatic conveyor generally of the type having a substantially enclosed plenum, the cross block comprising a frame member dimensioned to be received within and secured to the interior of the plenum, said frame member having means to maintain bottle neck support means in a parallel and co-planer relationship to thereby help maintain the vertical alignment of bottles or the like when suspended by the bottle neck support means and transported along the conveyor.

In yet a further aspect the invention provides a cross block for use in a pneumatic conveyor,the pneumatic conveyor being generally of the type having a substantially enclosed plenum with top, side and bottom surfaces, the cross block assisting in maintaining the vertical alignment of bottles and the like suspended from and transported along the conveyor, the cross block comprising a frame member being generally rectangular in configuration with end surfaces that are parallel and a bottom surface that is perpendicular to said end surfaces, said frame member dimensioned to be received within and secured to the interior of the plenum so as to extend between and be fastenable to the side surfaces of the plenum, said frame member including means to retain at least two bottle neck support means in a parallel and co-planer relationship such that said bottle neck support means are perpendicular to the side surfaces of the plenum to thereby assist in maintaining the vertical alignment of bottles or the like suspended from and transported along the conveyor.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
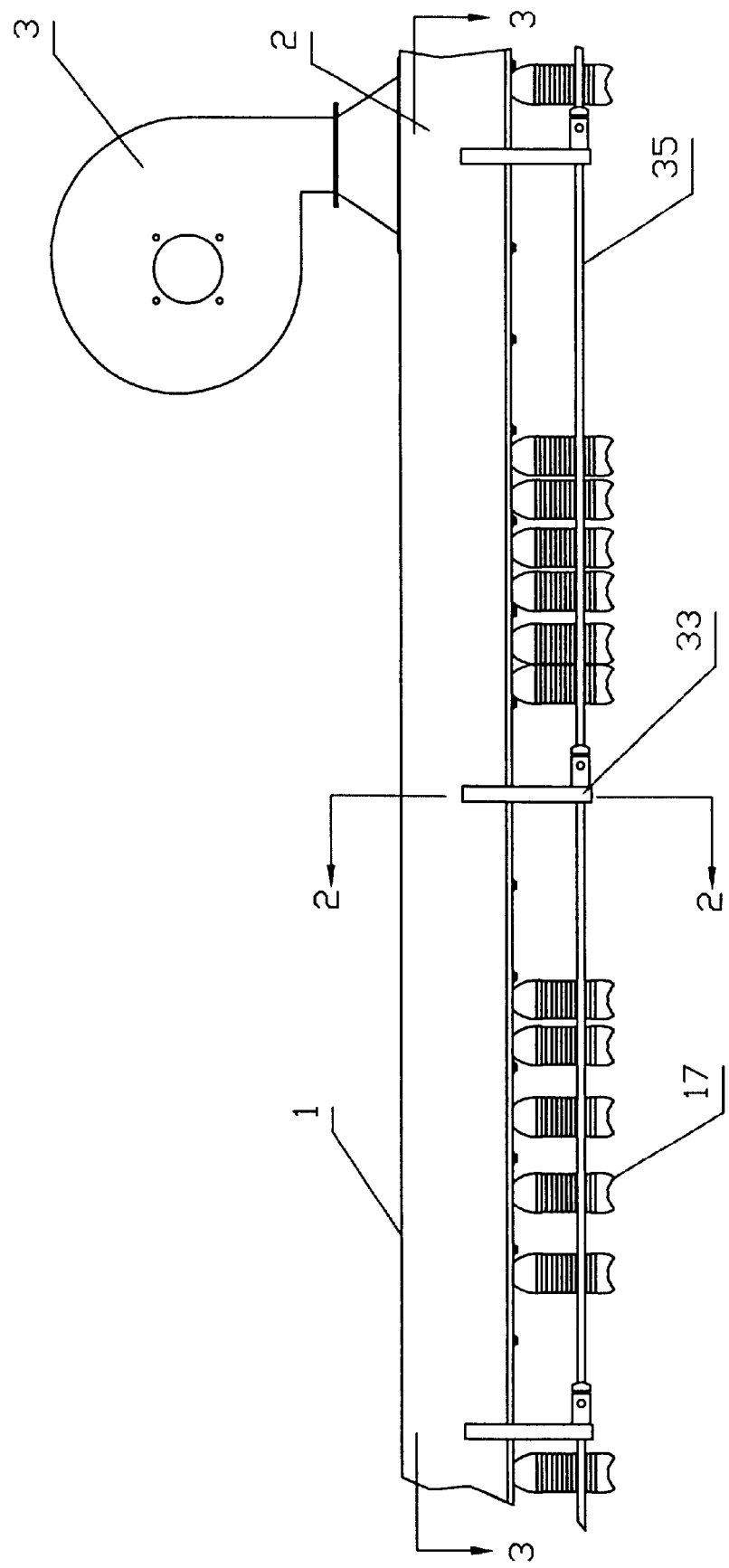
FIG. 1 is a side view of a portion of an air conveyor utilizing the plenum and cross block of the present invention.

The present invention may be embodied in a number of different forms. However, the specification and drawings that follow describe and disclose only some of the specific forms of the invention and are not intended to limit the scope of the invention as defined in the claims that follow herein.

In the attached Figures there is shown a pneumatic conveyor 1 comprised generally of a plenum 2 and a blower 3. Plenum 2 is generally rectangular in cross section and is comprised of a top surface 4, side surfaces 5 and a bottom portion 6, that together define a central housing and an internal air space 7. Whereas in prior similar devices the plenum is typically formed from a single piece of metal that is bent or broken to form a rectangular enclosure,in the case of the pneumatic conveyor of the present invention only the top and side surfaces are preferably formed from a single sheet of metal. However, it will be appreciated by those skilled in the art that the top and side surfaces could equally be comprised of separate components that are welded or otherwise fastened together. Plenum 2 not only provides a central housing for receiving pressurized air from blower 3,but also constitutes one of the primary structural features of the air conveyor. For that reason it is preferably comprised of a strong, rigid metal such as stainless, galvanized, or painted steel.

Figure 6:
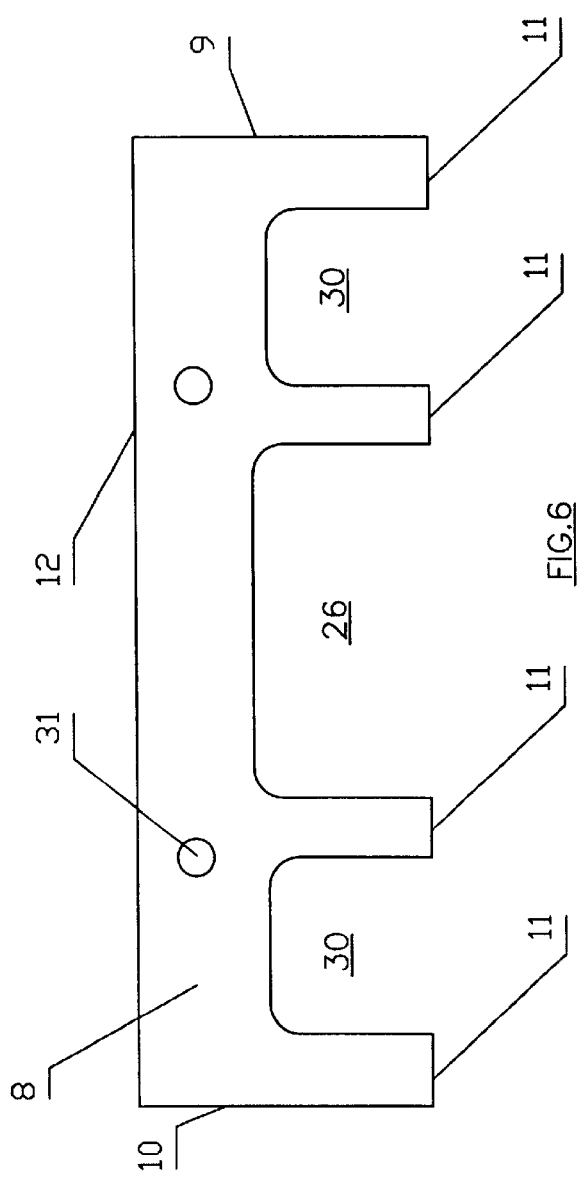
FIG. 6 is a side view of the cross block from the pneumatic conveyor shown in FIG. 2.

According to the present invention, the plenum 2 of pneumatic conveyor 1 further includes a cross block 8 that is positioned within the interior 7 of the plenum, generally spanning across its width between sides 5. In the preferred embodiment cross block 8 is generally rectangular in shape having parallel end surfaces 9 and 10, and a bottom surface 11 that is perpendicular to ends 9 and 10. As shown in FIG. 6, bottom surface 11 need not be continuous, but may be discontinuous and co planer while remaining perpendicular to ends 9 and 0. For ease of construction top surface 12 of cross block 8 is generally parallel to bottom surface 11 and perpendicular to ends 9 and 10. However, it will also be appreciated through an understanding of the invention that the precise configuration of top surface 12 is not substantially material to the function of the cross block.

Figure 8:
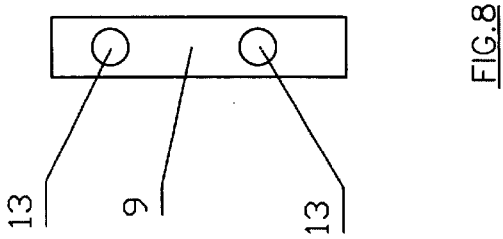

Cross block 8 is releasably securable to sides 5 of plenum 2, preferably through the use of bolts that may be threadably received into holes 13 (see FIG. 8) in ends 9 and 10 of the cross block. In this manner, when releasably secured to the sides of the plenum the parallel ends 9 and 10 of cross block 8 will maintain the sides of the plenum in a generally parallel configuration. It will thus be appreciated that cross block 8 can be utilized to hold and maintain sides 5 of plenum 2 in a fixed, parallel configuration, regardless of whether during manufacturing they are formed at angles other that 90 degrees to top surface 4.

Figure 7:
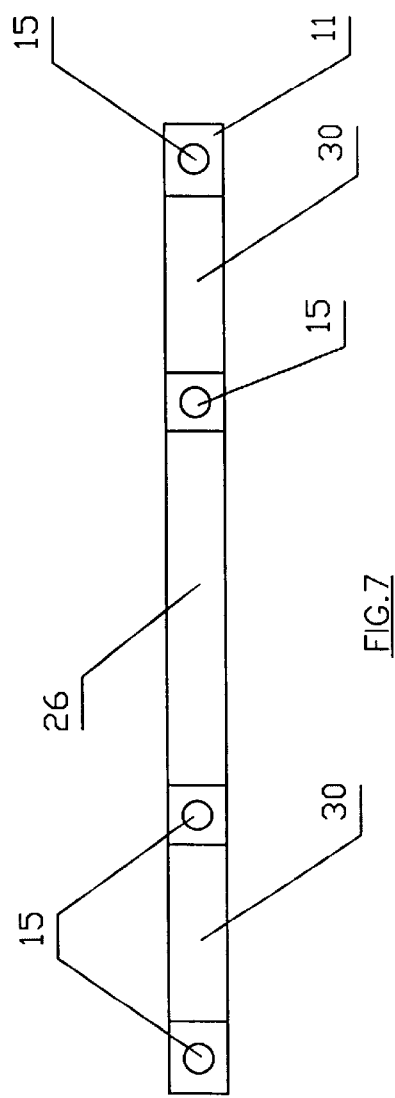
FIG. 7 is a bottom view of the cross block shown in FIG. 6; and, FIG. 8 is an end view of the cross block shown in FIG. 6.

In one preferred embodiment of the invention, bottom portion 6 of plenum 2 is comprised of one or more bottom plates 14 that arc releasably securable to bottom surface 11 of cross block 8. For case of construction, and to allow for replacement of bottom plates 14 if necessary, plates 14 are preferably secured to bottom 11 through the use of threaded screws that are received within bores 15 (see FIG. 7) in bottom 11. In this manner bottom plates 14 will thus be held generally perpendicular to ends 9 and 10 of cross block 8, and also perpendicular to the sides of the plenum. That is, through the incorporation of cross block 8 within the interior of the plenum the opposite side surfaces of the plenum are maintained parallel and bottom plates 14 are held perpendicular to the plenum's sides.

Pneumatic conveyor 1 further includes at least two bottle neck support means 16 to permit bottles 17 to be suspended therefrom. In the preferred embodiment bottle neck support means 16 comprise a pair of rails positioned on the bottom of the plenum and separated by a distance slightly larger than the diameter of the neck 18 of bottle 17, but smaller than the diameter of the bottle's neck flange 19. In this manner, a bottle received between neck support means 16 can be suspended from the plenum through the resting of neck flange 19 upon support means 16. To account for bottles having different length necks and different configurations of transition between their necks and lower portions, bottle neck support means 16 are preferably tapered or wedge shaped along their interior edge 20. In addition, bottle neck support means 16 are preferably secured to bottom plates 14 of plenum 2 through the use of a series of threaded bolts 21 received into threaded bores 22 in the bottom plates. Bottom plates 14 may be configured with a number of threaded holes 22 in different locations to allow for re-positioning of the bottle neck support means to accommodate bottles having different neck diameters. Alternately bottle neck support means 16 may be configured with slots to receive threaded bolts 21 in order that the bottle neck support means may be adjusted inwardly or outwardly to either reduce or enlarge the distance between them. In yet a further alternate embodiment, bottle neck support means 16 may be releasably secured directly to bottom surface 11 of cross block 8.

Regardless of whether bottle neck support means 16 are secured to bottom plates 14 or bottom surface 11 of cross block 8, it will be appreciated that through the described configuration of cross block 8 with its parallel ends and perpendicular bottom surface, the bottle neck support means will be maintained in a parallel and co-planer configuration. It will therefore be understood that in this manner cross block 8 helps to maintain the vertical alignment of bottle 17, and also facilitates in movement of bottles along the length of the plenum. That is, since bottom surface 11 of cross block 8 is perpendicular to the sides of the plenum, both bottom plates 14 and bottle neck support means 16 will also be held perpendicular to the plenum's sides. Therefore, when the plenum is situated such that its side surfaces are approximately vertical, cross block 8 will result in bottle neck support means 16 being held in a parallel, horizontal configuration. In this manner bottle neck flange 19 will also be maintained horizontally, thereby resulting in a vertical positioning of the bottle. Whereas in the prior art maintaining bottle neck supports in a parallel and co-planer configuration required considerable adjustment, the use of shims or spacers, and a variety of other mechanical structures, under the present invention no such additional devices are required as the inherent configuration of cross block 8 ensures the proper positioning of the bottle neck support means.

Figure 2:
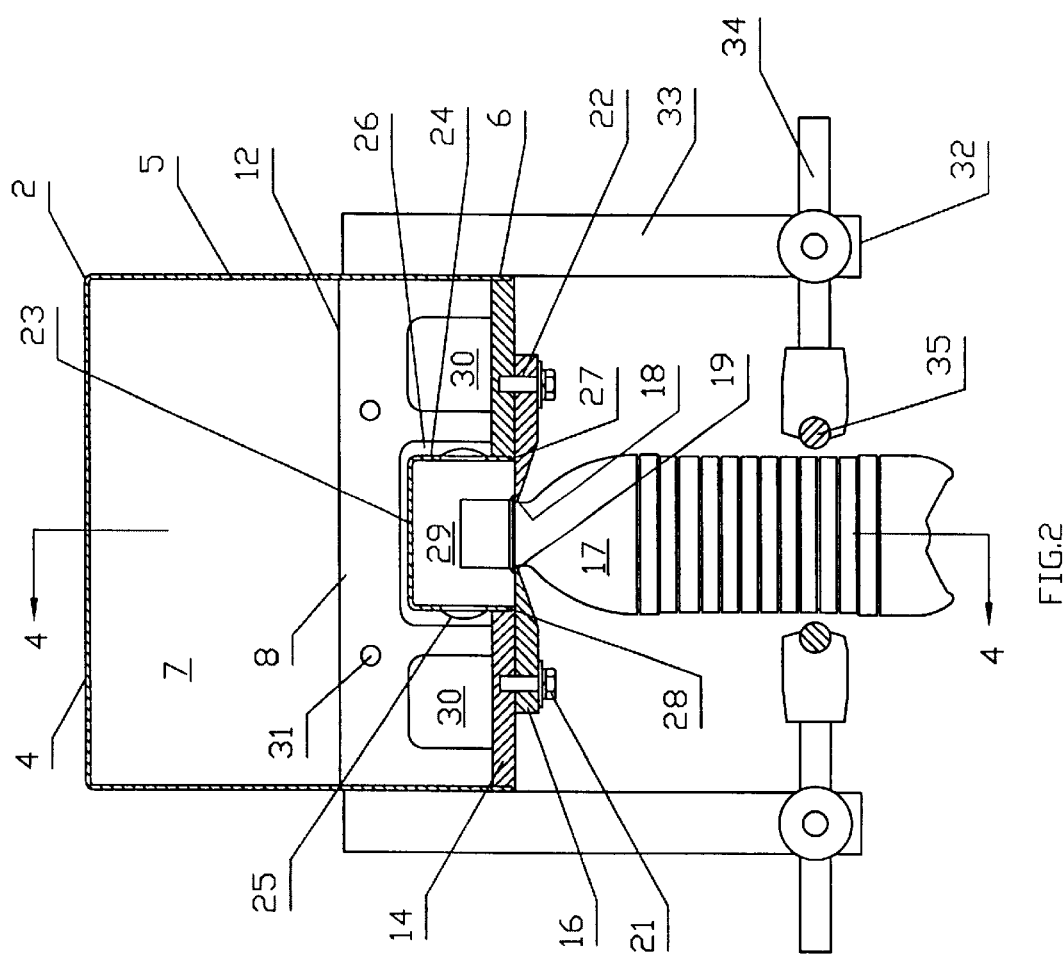
FIG. 2 is a vertical sectional view taken along the line 2—2 of FIG. 1.
Figure 3:
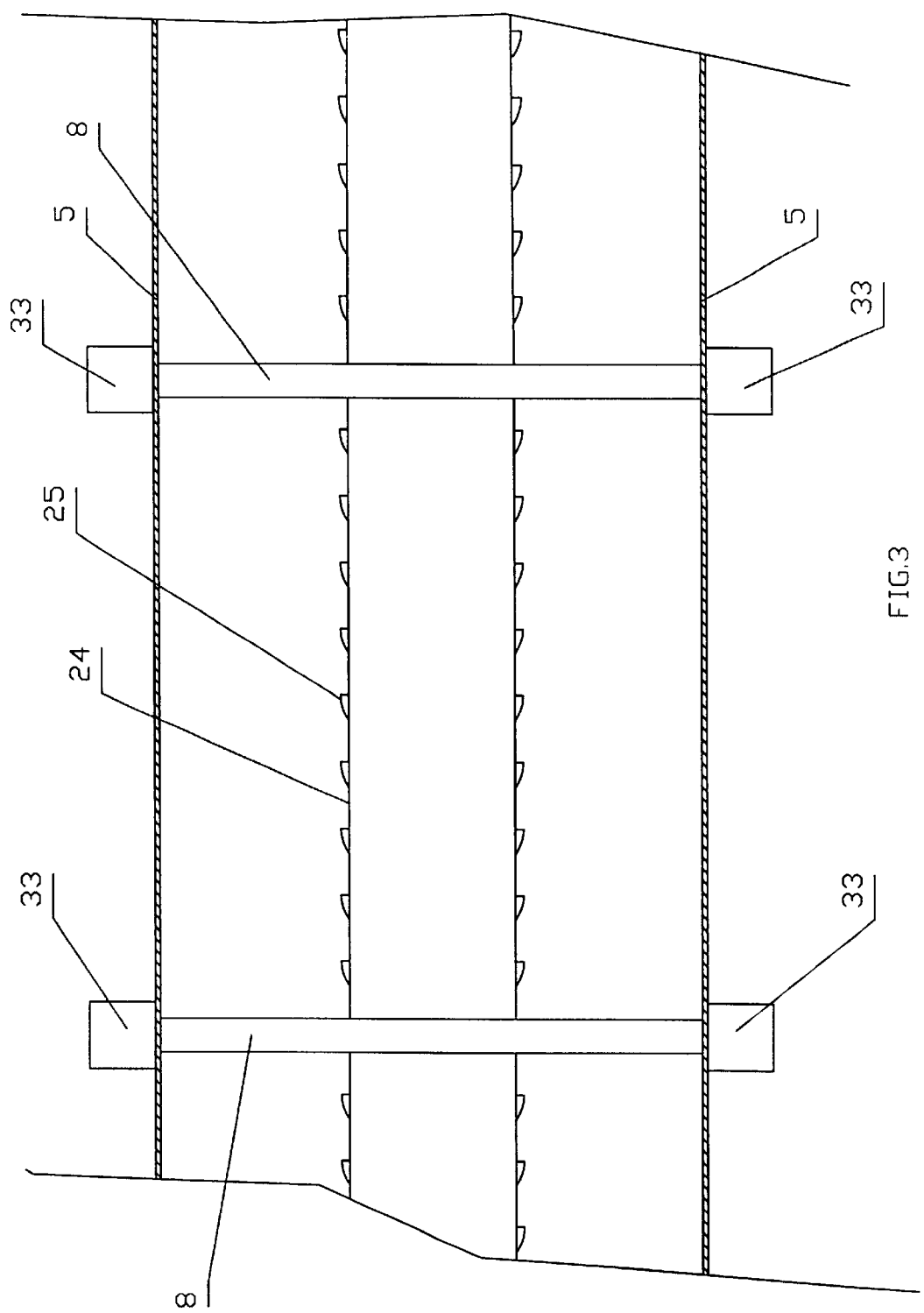
FIG. 3 is a horizontal sectional view taken along the line 3—3 of FIG. 1.
Figure 4:
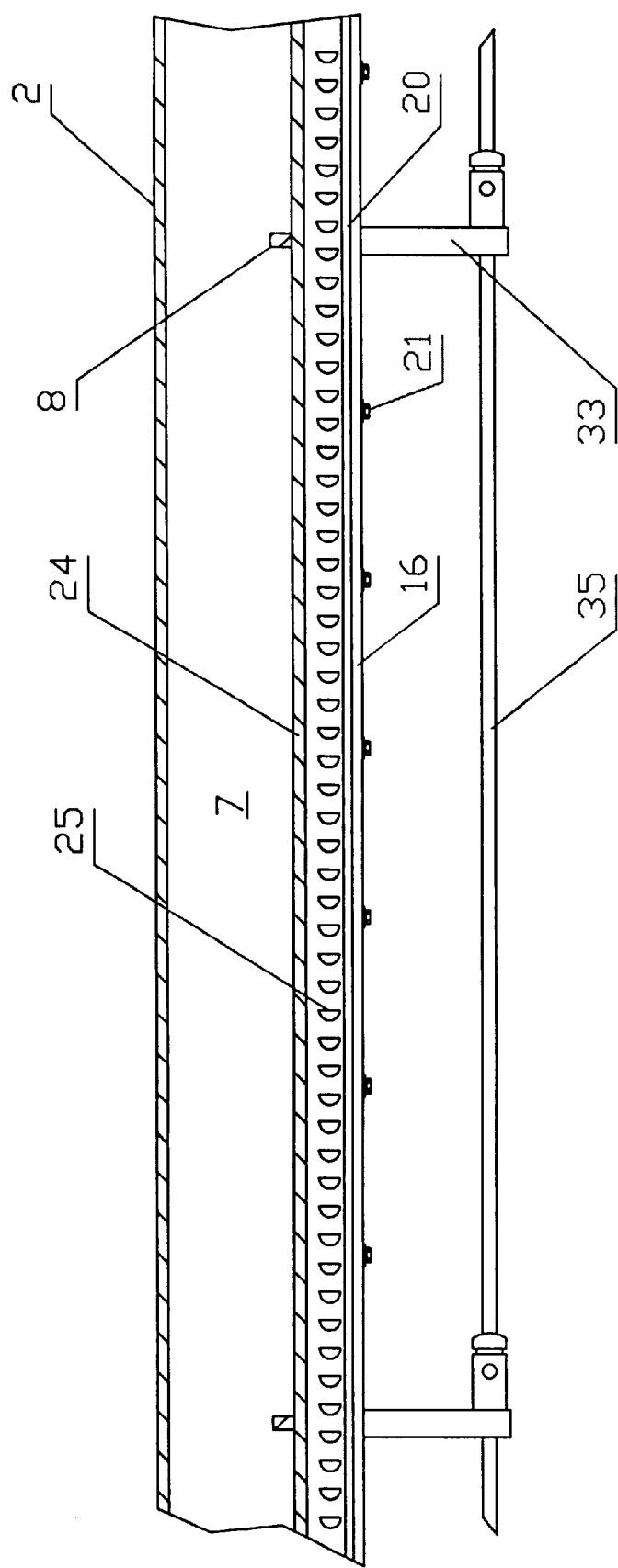
FIG. 4 is a vertical sectional view taken along the line 4—4 of FIG. 2.
Figure 5:
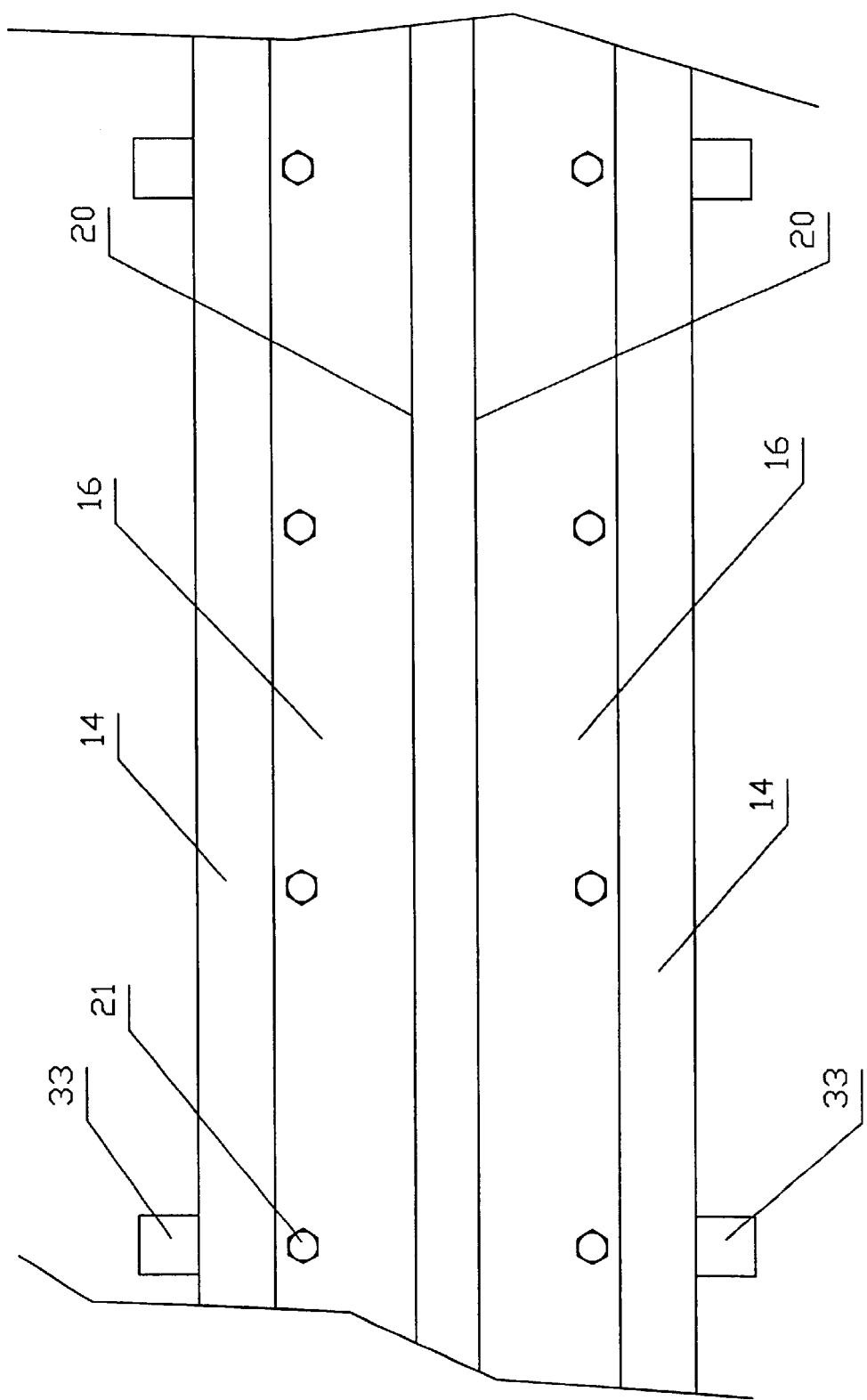
FIG. 5 is a bottom view of the pneumatic conveyor shown in FIG. 1 with its horizontal rails removed.

Plenum 2 futher includes air diversion means 23 in order to divert or direct pressurized air from the plenum's interior toward bottle neck support means 16 to force or drive bottles along the length of the plenum. In the preferred embodiment diversion means 23 comprises an air duct 24 having a series of louvers 25 to divert air from the plenum to the bottles. Air duct 24 is preferably comprised of a generally "U"-shaped structure running along the length of the plenum and received within a channel 26 in cross block 8. Air duct 24 may be held in place within channel 26 through the use of threaded bolts or other fasteners that are received into the frame of cross block 8. Alternatively, and as shown most clearly in FIG. 2, bottom plates 14 may include inwardly extending flanges 27 that overlap the lower edge 28 of air duct 24 such that when bottom plates 14 are secured to the cross block, flanges 27 bear against lower edges 28 and retain air duct 24 within channel 26. Through this structure there is removed the necessity for additional fastening devices to maintain the air duct in position. Such a configuration effectively creates an air channel or passageway 29 into which air is directed or diverted through louvers 25 to force or drive bottles (having their neck flanges 19 resting upon bottle neck support means 16) along the length of the conveyor.

The precise configuration, number and location of the louvers 25 is determined so as to direct sufficient volumes of air in a required direction for purposes of transporting bottles of a particular configuration. In instances where bottles of different configurations and different sizes require substantially different air flows in order to effect their transportation, the above described structure will enable the bottom portion of pneumatic conveyor 1 to be quickly and easily disassembled such that air duct 24 can be removed and replaced with a different duct having an alternate louver configuration. When replacing the duct and repositioning bottle neck support means 16, once again the structure of cross block 8 will ensure that bottle neck support means 16 are quickly and easily returned to a parallel and co-planer configuration.

For purposes of weight reduction, and also to minimize the restriction of air flow through plenum 2, in the preferred embodiment cross block 8 includes air flow passageways 30. In a plenum there will typically be a plurality of cross blocks positioned at regular intervals along its length. Accordingly, the alignment of air flow passageways 30 in adjacent cross blocks will help to ensure there is minimal air flow restriction in the plenum. To accomplish their purpose, cross blocks 8 merely need to be rigid and able to support the weight of bottles 17 and the structures which are attached and hung from the cross blocks. Typically, the cross blocks would be comprised of stainless steel, galvanized steel, painted steel, aluminum, plastic, or a composite material. Depending, upon the particular materials from which the cross blocks and plenum are constructed, the relative spacing between adjacent cross blocks can very substantially. However, for most applications it is expected that the cross blocks will be located approximately every 24 to 36 inches along the length of the plenum.

In a typical pneumatic conveyor a series of plenum sections are connected together to form the overall conveyor system. In order to allow for a smooth transition between adjacent plenum sections it is necessary for adjacent sections to be properly aligned.

Proper alignment of adjacent plenum sections is also necessary so that there is a smooth transition between adjacent bottle neck support means 16 on different plenum sections. To facilitate in alignment of adjacent plenum sections, in the preferred embodiment cross block 8 includes alignment holes 31 that are oriented generally parallel to the longitudinal axis of the plenum such that they can accept alignment rods of an adjacent plenum section and assist in aligning and connecting adjacent plenum portions together. Alternately. A double width cross block could be utilized wherein the ends of two adjacent bottle neck support means 16 on different plenum portions could be threadably secured to a single extra wide or double cross block. In either case, cross block 8 performs the further function of helping to ensure alignment of adjacent plenum sections when the overall conveyor system is assembled.

Finally, pneumatic conveyor will also typically include bottle guides 32 positioned on each side of plenum 2. Bottle guides 32 comprise vertical posts 33, horizontal arms 34, and horizontal rails 35. Vertical posts 33 are secured to opposite sides 5 of plenum 2 and extend downwardly from the bottom of the plenum. Through the incorporation of cross block 8 that maintains sides 5 in a parallel configuration, vertical posts 33 will thus also be maintained parallel to each other, and to the sides of the plenum. The lower ends of vertical posts 33 are fitted with horizontal arms 34 that retain horizontal rails 35 running parallel to the longitudinal axis of pneumatic conveyor 1. An adjustable connection between horizontal arms 34 and vertical posts 33 allows for rails 35 to be moved inwardly or outwardly to accommodate bottles of different diameters.

From an understanding of the structure described above and as shown in the attached figures, one skilled in the art will appreciate that the utilization of a series of cross blocks 8 positioned along the length of the plenum in a pneumatic conveyor will greatly assist in maintaining the vertical alignment of bottles that are transported by the conveyor system. The cross blocks essentially provide a stable and rigid structure to which the major structural components of the conveyor can be fastened in order to maintain them in a rigid and "square"configuration. Such a structure ensures that the sides of the conveyor are parallel, as are vertical posts 33 of bottle guides 32. The structure also ensures that bottle neck support means 16 are maintained both parallel and co-planer to reduce or avoid the mis-alignment or tipping of bottles, as is common in prior art structures. Finally, cross block 8 also enables for the quick and efficient changing of air duct 24 so it can be replaced with a duct having a different louver configuration as may be necessary for the transportation of bottles of different sizes, shapes and weights. Further, where bottle neck support means 16 become worn and must be replaced the re-alignment of the neck support means can be accomplished quickly and simply, without the need for special tools or additional spacers or other alignment structures.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while in the attached drawings bottle neck support means 16 are shown as preferably tapered, they could alternately be of a variety of other configurations without affecting the scope of the present invention.

I claim:

1. A plenum for a pneumatic conveyor for the movement of bottles,the plenum comprising:

(i) a central housing for receiving pressurized air, said central housing having generally enclosed top and side panels, and having a generally open bottom;

(ii) a cross block positioned within said central housing and generally spanning across its width;

(iii) at least two bottle neck support means, said bottle neck support means permitting bottles to be suspended from said plenum;

(iv) air diversion means to divert pressurized air from the interior of said central housing to said bottle neck support means to drive bottles along the length of said plenum; and, (v) means to enclose said open bottom of said central housing;

wherein said cross block fixes the vertical positioning of said bottle neck support means to maintain said bottle neck support means in a parallel and co-planer configuration thereby helping to maintain the vertical alignment of bottles suspended from said plenum and facilitating in their movement the length of said plenum.

2. The device as claimed in claim 1 wherein end surfaces of said cross block are parallel and the bottom surface is perpendicular to said end surfaces.

3. The device as claimed in claim 2 including bottle guides located on each side of said plenum to assist in maintaining the vertical alignment of bottles suspended from or transported by the conveyor, said bottle guides releas securable to said end surfaces of said cross block and thereby held in a parallel configuration.

4. The device as claimed in claim 2 wherein said cross block extends between and is fastened to said enclosed side panels of said central housing to thereby maintain said enclosed side panels in a generally parallel configuration.

5. The device as claimed in claim 4 wherein said bottle neck support means are releasably securable to said bottom surface of said cross block and thereby maintained in said parallel and co-planer configuration.

6. The device as claimed in claim 4 including bottle guides located on each side of said plenum to assist in maintaining the vertical alignment of bottles suspended from or transported by the conveyor, said bottle guides releasably securable to said side panels of said plenum and thereby held in a parallel configuration.

7. The device as claimed in claim 4 wherein said means to enclose said open bottom of said central housing comprises one or more bottom plates that are secured to said bottom surface of said cross block and thereby maintained generally perpendicular to said side panels of said central housing.

8. The device as claimed in claim 7 wherein said bottle neck support means are releasably securable to said one or more bottom plates and thereby maintained in said parallel and co-planer configuration.

9. The device as claimed in claim 8 wherein said cross block includes air flow passageways therethrough.

10. The device as claimed in claim 9 wherein said cross block includes alignment holes therethrough, said alignment holes oriented generally parallel to the longitudinal axis of said plenum and accepting alignment rods of an adjacent plenum section to assist in aligning and connecting adjacent plenum portions together.

11. The device as claimed in claim 10 wherein said plenum includes a plurality of said cross blocks positioned along its length.

* * * * *